Nov. 12, 1929.　　　W. E. SEPPMAN　　　1,735,508
KNEE OPERATED THROTTLE CONTROL
Filed Dec. 28, 1927　　　3 Sheets-Sheet 1
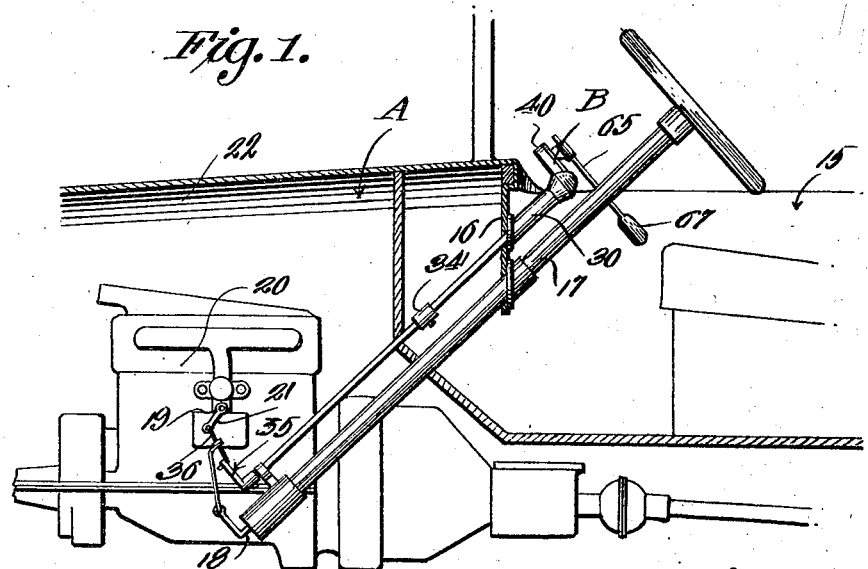
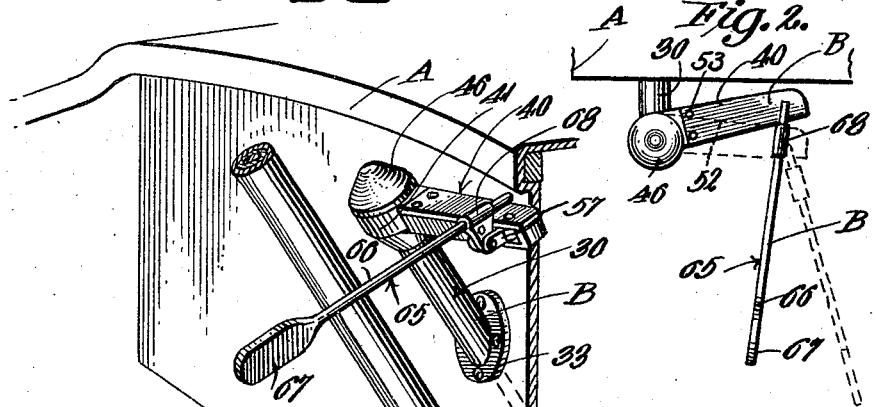
WITNESSES
Inventor
WILLIAM E. SEPPMAN
By Richard B. Owen, Attorney

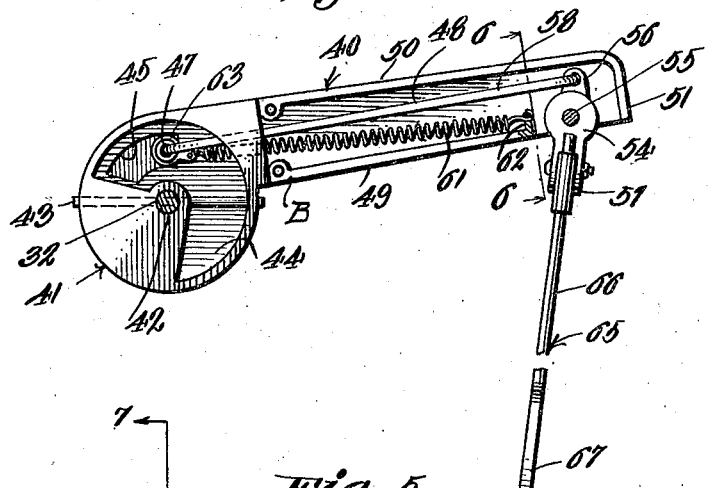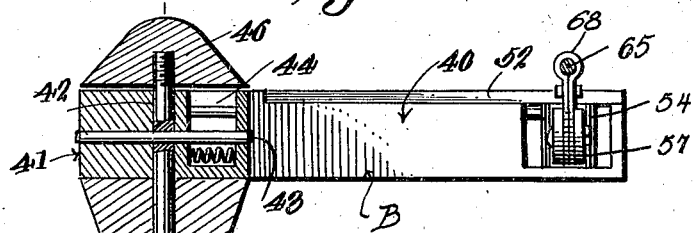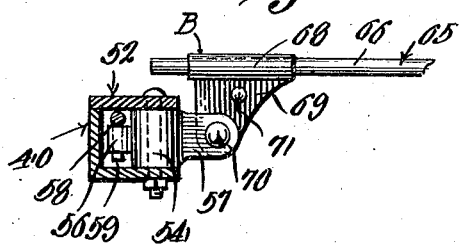

Nov. 12, 1929. W. E. SEPPMAN 1,735,508
KNEE OPERATED THROTTLE CONTROL
Filed Dec. 28, 1927 3 Sheets-Sheet 3
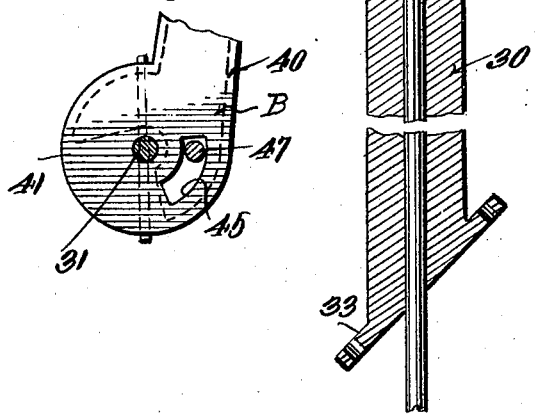
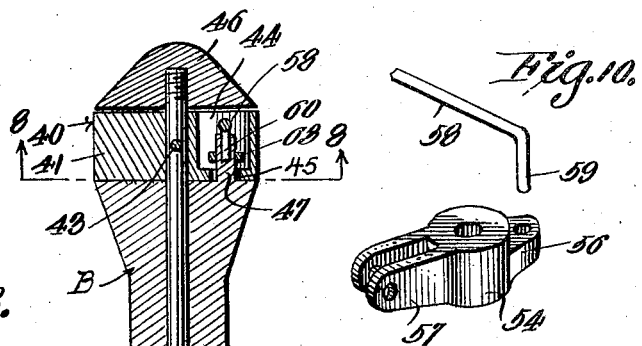
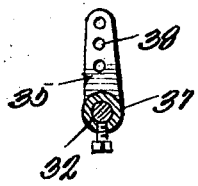
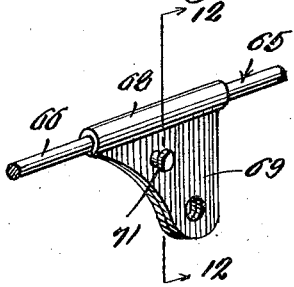
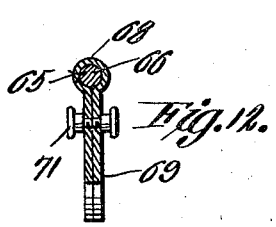
Inventor
WILLIAM E. SEPPMAN Patented Nov. 12, 1929

1,735,508

UNITED STATES PATENT OFFICE

WILLIAM E. SEPPMAN, OF LAKE CRYSTAL, MINNESOTA

KNEE-OPERATED THROTTLE CONTROL

Application filed December 28, 1927. Serial No 243,003.

This invention relates to motor vehicles and more particularly to novel means for controlling the speed of an engine and is an improvement over my prior patent issued to me August 20, 1918, Patent No. 1,276,423.

One of the primary objects of the invention is to provide means for generally simplifying the construction shown in my prior patent and to ensure the positive and easy operation of the throttle of the engine by the knee lever.

Another important object of the invention is the provision of novel means for arranging the control lever for the throttle of the engine and adjacent to the steering column and instrument board so that not only will the lever be easy to operate, but the same will be out of the way of the driver and passenger of the motor vehicle.

Another object of the invention is the provision of a knee operated throttle control lever for an internal combustion engine embodying an operating shaft arranged substantially in parallelism with the steering column connected by means of a link and crank with the throttle valve of the engine, with novel means for actuating the shaft by the knee of the operator, while the operator has his foot on the brake pedal, the device being so arranged that a relatively short movement of the lever will cause the actuation of the throttle valve.

A further object of the invention is the provision of a novel crank and lever mechanism connected with the rock shaft for operating the throttle valve, the lever and crank being so arranged that the rock shaft will be positively operated upon a relatively small movement of the lever and will be automatically returned to normal position upon the release of pressure upon the lever.

A further object of the invention is the provision of novel means for connecting the lever to the crank, whereby the lever can be readily moved in inoperative position out of the path of the driver's knee when the same is not in use.

A still further object of the invention is to provide a knee-operated throttle attachment for motor vehicles of the above character, which will be durable and efficient in use, one that will be simple and easy to manufacture, and one which can be placed upon the market and incorporated with a conventional motor vehicle construction at a small cost.

With these and other objects in view, the invention consists in the novel construction, arrangement and formation of parts, as will be hereinafter more specifically described, claimed and illustrated in the accompanying drawings, in which drawings, Figure 1 is a fragmentary longitudinal section through an automobile showing my improved knee-actuated throttle control mechanism connected therewith, Figure 2 is a top plan view of the operating mechanism for the throttle valve showing the same in full lines in its normal position and in broken lines in its operatve position for increasing the speed of the engine, Figure 3 is a fragmentary perspective view showing the improved attachment incorporated with the instrument board of a motor vehicle and showing the arrangement of the rock shaft with the steering column, Figure 4 is a top plan view partly in sections of the operating mechanism for the rock shaft, the cover plate of the operating crank being removed to show the interior construction of the operating mechanism, Figure 5 is a longitudinal section through the supporting post of the improved device, showing the operating crank in side elevation, the hub thereof being shown in section, Figure 6 is a detailed transverse section through the operating crank taken on the line 6—6 of Figure 4, looking in the direction of the arrows, illustrating the connection between the crank and the operating knee lever, Figure 7 is a section taken at right angles of Figure 5 on the line 7—7 of Figure 5 looking in the direction of the arrows, Figure 8 is a detailed section taken on the line 8—8 of Figure 7 looking in the direction of the arrows illustrating the bottom formation of the hub of the operating crank, Figure 9 is a detailed section taken on the line 9—9 of Figure 7 looking in the direction of the arrows illustrating the throw crank carried by the lower end of the crank shaft, Figure 10 is a detailed perspective view illustrating the means employed for connecting the knee operating lever with the supporting post for the rock shaft, Figure 11 is a detailed perspective view showing the means employed for connecting the operating knee lever with the operating crank, Figure 12 is a section through said means taken on the line 12—12 of Figure 11 looking in the direction of the arrows.

Referring to the drawings in detail, wherein similar reference characters designate corresponding parts throughout the several views, the letter A generally indicates a motor vehicle and B the improved attachment therefor.

The automobile A can be of any desired make or type and has merely been shown to illustrate the use of the attachment B and this vehicle can either be of the passenger type as shown, or a motor truck, tractor or the like. The same includes the usual body 15, instrument board 16, through which extends the steering column 17. The steering column 17 can be provided with the usual rock shaft 18 for actuating the throttle 19 of the internal combustion engine 20. It is to be noted that the throttle is of the usual construction and is provided with an operating crank 21.

The device B is so constructed as to permit the same to be used in close proximity to the steering column 17 so that all floor projections and the like will be eliminated and the attachment comprises a supporting post or column 30 which can be of a solid construction. This post is provided with an axial bore 31 in which is rotatably mounted the rock shaft 32 which forms a salient feature of the invention. This post 30 can be clamped directly to the shell of a steering column if desired, or, as shown, the lower end thereof can be provided with a flange 33 through which extends suitable bolts or screws for securing the post to the instrument board 16 in parallelism with the column 17. The opposite ends of the rock shaft 32 extend above and below the post 30 and the rock shaft extends entirely through the instrument board 16 and under the hood 22. To facilitate the assembling of the device the rock shaft 32 is preferably made in sections and these sections can be connected together by suitable couplings or sockets 34 carried by one section thereof, as clearly shown in Figure 7 of the drawings. The extreme lower end of the rock shaft carries a crank 35 which is connected by means of a suitable link 36 with the crank 21 of the throttle 19. I prefer to provide the hub 37 of the crank with a suitable socket or sleeve for receiving the lower end of the rock shaft 32 and to have the crank itself provided with a plurality of openings 38 so that the link 36 can be initially set to the best advantage according to the position of the draw-arm or crank 21 of the throttle relative to the operating crank arm 35. It is obvious that upon movement of the rock shaft 32 that the throttle valve will be actuated therewith.

In order to ensure the proper operation of the rock shaft 32, I provide a novel operating mechanism therefor which includes a main operating crank 40. This crank 40 extends outwardly from its supporting post 30 and away from the steering column 17 and has its inner end formed with a hub 41. This hub 41 is provided with an axial bore 42 in which is received the rock shaft 32. Any desired means can be employed for rigidly connecting the hub with the rock shaft and, in the present instance, I have shown a pin 43 for this purpose. The upper face of the hub is provided with a segmental recess 44 and the lower face of the recess is provided with an arcuate slot 45 which opens out through the lower face of the hub. The segmental recess 44 is normally closed by a cap 46 which is threaded on the upper end of the rock shaft 32 and this cap completely covers the upper face of the hub. In accordance with the invention, an eccentric pin or stud 47 is formed on the upper end of the post 30 and this pin or stud extends into the segmental recess 44 through the arcuate slot 45. The purpose of this pin will be brought out, as the description proceeds.

The body portion of the operating crank 40 is preferably formed of a hollow construction, including a bottom wall 48, side walls 49 and 50 and an end wall 51. A removable cover plate 52 is provided for the operating crank arm and is held in place in any desired way, such as by the use of screws 53. The side wall 49 adjacent to the end wall 51 is cut away for the reception of a sleeve 54 which is rotatably mounted upon a shaft or bolt 55 secured to the operating crank arm. The inner end of the sleeve 54 is provided with a radially extending relatively short arm 56 and the opposite side of the sleeve is provided with a pair of spaced pivot ears 57 which extend outward of said operating crank arm. A link 58 is provided for connecting the short arm 56 with the pin 47 and this link 58 is provided with depending pivot lugs 59 and 60 at its opposite ends, one of which is pivotally mounted within the short arm 56 and the other pivotally mounted within a recess formed in said pin 47.

By this construction, the sleeve 54 is connected with the pin 47. At this point, it is to be noted that the pin 47 is connected with the operating crank arm adjacent to the outer end thereof by the use of a relative heavy contractile coil spring 61. One end of the spring is anchored to a lug 62 formed on the arm 40 adjacent to the outer end thereof, while the opposite end of the spring is anchored to a collar 63 which is rotatably mounted upon the pin 47. The provision of this spring 61 normally holds the crank arm 40 and the pin is a predetermined relation.

The operating knee lever 65 is carried by or connected with the sleeve 64 and this operating knee lever includes a cylindrical arm 66 terminating at its outer end in a flat head 67 which is normally disposed in the path of the operator's right knee on the vehicle. The inner end of the cylindrical arm 66 is mounted within a sleeve 68 in such a manner as to permit adjustment of the knee lever in said sleeve and this sleeve has formed thereon the depending ears 69 which are received between the pivot ears 57 of the sleeve 54. A pivot pin 70 is utilized for connecting the ears 69 with the ears 57 and it is obvious that the knee lever can be swung down below the operating crank 40 and out of the way of the operator's knee when so desired. It is also obvious that when movement is imparted to the operating knee lever that movement will be imparted to the crank 40 and consequently to the rock shaft 42. The entire device is so arranged that the operating knee lever will be directly above the brake pedal of the vehicle so that the operator can simultaneously operate the brake pedal and the throttle valve and that the arrangement entirely eliminates the necessity of the usual foot throttle valve control, which makes it inconvenient for the quick control of the brake pedal.

In operation of the improved device, when pressure is applied to the knee throttle lever by the operator's knee, toward the right, this movement will be imparted to the sleeve 54 which will push inward on the link 58 and the pin 47 and upon continued movement of the knee lever the crank 40 will be swung inwardly operating the rock shaft and consequently actuating the throttle valve. As the crank 40 is moved, the spring 61 is placed under tension and as soon as pressure is relieved from the knee throttle lever the various parts will assume their normal position as shown in Figure 4 of the drawings.

From the foregoing, it can be seen that very slight pressure is needed to actuate the throttle valve and that a relatively short movement of the knee will be sufficient to actuate the said valve.

Changes in details may be made without departing from the spirit or the scope of this invention but what I claim as new is:—

1. A knee operated throttle control device for motor vehicles comprising a post, a rock shaft rotatably carried by the post, means carried by the rock shaft for engagement with the throttle valve of an internal combustion engine, a crank connected with the rock shaft for movement therewith, an eccentrically disposed pin carried by the post, a knee operated lever pivotally associated with the crank, and a link operatively connecting the inner end of the knee lever to said pin.

2. A knee operated throttle control device for motor vehicles comprising a post, a rock shaft rotatably carried by the post, means carried by the rock shaft for engagement with the throttle valve of an internal combustion engine, a crank connected with the rock shaft for movement therewith, an eccentrically disposed pin carried by the post, a knee operated lever pivotally associated with the crank, a link operatively connecting the inner end of the knee lever to said pin, and means normally tending to return the lever to a normal inoperative position.

3. A knee operated throttle control for the engine of motor vehicles comprising a stationary post, a rock shaft rotatably carried by the post, means connected with the rock shaft for operative engagement with the throttle valve of the engine, a crank rigidly connected with the rock shaft, a knee lever pivotally connected to the outer end of said crank, a link pivotally connected to the inner end of the said lever beyond the pivot point thereof and pivotally and eccentrically secured to the post, as and for the purpose specified.

4. A knee operated throttle control for internal combustion engines of motor vehicles comprising a supporting post, a rock shaft rotatably carried by the post, means carried by the rock shaft for operative connection with the throttle valve of the engine, a crank rigidly connected with the rock shaft, a sleeve rotatably carried by the outer end of the crank having an arm extending radially from one side thereof and pivot ears from the opposite side thereof, a link pivotally connected to said arm, means pivotally and eccentrically connecting the link to the post, and a knee lever pivotally carried by said ears.

5. A knee operated mechanism for the throttle valves of internal combustion engines of motor vehicles comprising a supporting post, a rock shaft rotatably carried by the post, and extending axially therethrough, a stationary pin formed eccentrically on said post, a crank rigidly connected with the rock shaft including a hollow arm, a sleeve rotatably carried by the outer end of said hollow arm having a throw arm on one side thereof and pivot ears on the opposite side thereof, a link pivotally connected to said throw arm and to said pin, a knee lever pivotally connected to said ears, and a contractile coil spring connected to said pin and to the outer end of said arm.

6. Knee controlled mechanism for operating the throttle valve of an internal combustion engine for motor vehicles comprising a supporting post, a rock shaft rotatably carried by the post, means carried by the lower end of the rock shaft for operative connection with the throttle valve of an internal combustion engine, a pin rigidly carried by the post eccentrically disposed relative to the rock shaft, a crank rigidly connected to said rock shaft having a hollow arm, a sleeve rotatably carried by the outer end of said hollow arm having an inwardly extending throw arm on one side and pivot ears on the opposite side, a link pivotally connected to said throw arm and pivotally connected to said eccentrically disposed pin, a knee lever connected to said ears, a contractile coil spring having its opposite terminals secured respectively to said pin and to the outer end of said hollow arm, the spring, link, and sleeve being enclosed by said hollow arm.

In testimony whereof I affix my signature.

WILLIAM E. SEPPMAN.